US007999851B2

(12) United States Patent
Nunez Weissman et al.

(10) Patent No.: US 7,999,851 B2
(45) Date of Patent: Aug. 16, 2011

(54) OPTICAL ALIGNMENT OF CAMERAS WITH EXTENDED DEPTH OF FIELD

(75) Inventors: Liron Nunez Weissman, Tel-Aviv (IL); Uri Kinrot, Hod Hasharon (IL); Alex Alon, Binyamina (IL); Irina Alon, Binyamina (IL)

(73) Assignee: Tessera Technologies Ltd., San Jose, CA (US)

( * ) Notice: Subject to any disclaimer, the term of this patent is extended or adjusted under 35 U.S.C. 154(b) by 562 days.

(21) Appl. No.: 12/125,132

(22) Filed: May 22, 2008

(65) Prior Publication Data

US 2008/0316317 A1    Dec. 25, 2008

Related U.S. Application Data

(60) Provisional application No. 60/931,721, filed on May 24, 2007.

(51) Int. Cl.
*H04N 17/00* (2006.01)
(52) U.S. Cl. .................................. 348/188; 348/187
(58) Field of Classification Search .............. 348/175
See application file for complete search history.

(56) References Cited

U.S. PATENT DOCUMENTS

| | | | | |
|---|---|---|---|---|
| 5,760,829 A * | 6/1998 | Sussmeier | ...................... | 348/187 |
| 5,805,218 A * | 9/1998 | Ohura et al. | .................. | 348/353 |
| 6,320,641 B1 * | 11/2001 | Bauer et al. | ...................... | 355/18 |
| 6,768,509 B1 * | 7/2004 | Bradski et al. | ........... | 348/207.99 |
| 7,440,007 B2 * | 10/2008 | Hoshi | ......................... | 348/208.7 |
| 7,479,982 B2 * | 1/2009 | Otani et al. | .................. | 348/188 |
| 7,536,094 B2 * | 5/2009 | Ichimiya | ......................... | 396/89 |
| 2004/0109080 A1 * | 6/2004 | Chan et al. | .................... | 348/345 |
| 2004/0252195 A1 * | 12/2004 | Lu et al. | ......................... | 348/188 |
| 2005/0013504 A1 * | 1/2005 | Noma et al. | .................. | 382/255 |

FOREIGN PATENT DOCUMENTS

WO  WO-2007054938  5/2007

* cited by examiner

*Primary Examiner* — David L Ometz
*Assistant Examiner* — Angel L Garces-Rivera
(74) *Attorney, Agent, or Firm* — Hickman Palermo Truong & Becker LLP (57) ABSTRACT

A method for calibration of an imaging device that includes a sensor and optics for forming an image on the sensor. The method includes making a first image quality measurement, based on an output of the sensor, while imaging a first target at a first distance from the device and varying an offset between the optics and the sensor. A second image quality measurement is made while imaging a second target at a second distance from the device, which is different from the first distance, and varying the offset between the optics and the sensor. A working point of the optics is set relative to the sensor responsively to the first and second image quality measurements.

27 Claims, 4 Drawing Sheets

OPTICAL ALIGNMENT OF CAMERAS WITH EXTENDED DEPTH OF FIELD

CROSS-REFERENCE TO RELATED APPLICATION

This application claims the benefit of U.S. Provisional Patent Application 60/931,721, filed May 24, 2007, which is incorporated herein by reference.

FIELD OF THE INVENTION

The present invention relates generally to imaging devices, and specifically to methods and systems for optical alignment of imaging devices.

BACKGROUND OF THE INVENTION

The objective optics used in most digital cameras are typically designed so as to minimize the optical point spread function (PSF) and maximize the modulation transfer function (MTF) of the optics, subject to the limitations of size, cost, aperture size, and other factors imposed by the camera manufacturer.

On the other hand, the optics in some imaging systems, such as certain digital cameras with extended depth of field, are intentionally designed in a manner that does not meet these criteria. For example, PCT International Publication WO 2007/054938, whose disclosure is incorporated herein by reference, describes an optical imaging assembly that may be used in a digital camera and is constructed so as to generate a distorted image at the imaging plane of the assembly. The digital camera incorporates a sensor at the imaging plane, and the distorted image formed on the sensor is corrected by a deconvolution engine so as to produce an undistorted image. The optical imaging assembly is configured to produce a high defocus aberration coefficient, greater than approximately 0.1, across the distorted image when the image is optimally focused to a focal plane of the assembly.

The high defocus aberration coefficient causes the MTF for the assembly to have generally equal low values for all objects in a large field, typically from infinity to approximately 10 cm from the assembly. Because of the equal values of the MTF at the different object distances within the field, the deconvolution engine may be configured to improve the MTF of all the images at the different object distances. The final images thus produced by the assembly and the deconvolution engine are substantially free of aberrations for all objects within the field, so that the digital camera has a large depth of field.

SUMMARY OF THE INVENTION

The process of manufacturing an optical imaging device, such as a digital camera, typically includes an optical calibration procedure. The purpose of this procedure is to adjust the optics to a working point that gives optimal performance of the imaging device, which is generally the point of sharpest focus.

In some devices, however, such as cameras with extended depth of field, finding the optimal working point is more complicated, because the optics may be designed to give roughly uniform focal resolution over a large range of object distances. Furthermore, to facilitate image reconstruction by the deconvolution engine, the optics may be intentionally designed to give a blurred image. Embodiments of the present invention that are described hereinbelow provide methods and systems for calibration that can be useful in overcoming these difficulties.

There is therefore provided, in accordance with an embodiment of the present invention, a method for calibration of an imaging device that includes a sensor and optics for forming an image on the sensor, the method including:

making a first image quality measurement, based on an output of the sensor, while imaging a first target at a first distance from the device and varying an offset between the optics and the sensor;

making a second image quality measurement, based on the output of the sensor, while imaging a second target at a second distance from the device, which is different from the first distance, and varying the offset between the optics and the sensor; and setting a working point of the optics relative to the sensor responsively to the first and second image quality measurements.

In some embodiments, making the first and second image quality measurements includes completing the first image quality measurement, and then performing the second image quality measurement. Alternatively, making the first and second image quality measurements includes performing the first and second image quality measurements simultaneously, with the first and second targets positioned in different, respective parts of a field of view of the imaging device.

In a disclosed embodiment, the first and second targets includes edges, and making the first and second image quality measurements includes measuring a spread of the edges in the output of the sensor.

In some embodiments, making the first and second image quality measurements includes generating first and second curves representing a measure of image quality as a function of the offset, and setting the working point includes identifying a reference point at which the first and second curves cross one another. In a disclosed embodiment, setting the working point includes adjusting the offset between the optics and the sensor by a specified displacement from the reference point in order to reach the working point.

In one embodiment, making the first and second image quality measurements includes illuminating the first and second targets with monochromatic illumination while making the image quality measurements.

There is also provided, in accordance with an embodiment of the present invention, a method for calibration of an imaging device that includes a sensor and optics for forming an image on the sensor, the method including:

specifying a working point for the imaging device, which defines an offset between the optics and the sensor, and a displacement between the working point and a reference point;

performing a calibration procedure so as to determine a location of the reference point responsively to an output of the sensor during the calibration procedure; and adjusting the imaging device responsively to the location of the reference point and the specified displacement, so that the optics are located at the working point relative to the sensor.

Typically, performing the calibration procedure includes imaging a calibration target onto the sensor using the optics, wherein the offset between the optics and the sensor that is defined by the working point is not the offset that gives the sharpest image of the calibration target on the sensor.

There is additionally provided, in accordance with an embodiment of the present invention, a system for calibration of an imaging device that includes a sensor and optics for forming an image on the sensor, the system including:

a first target at a first distance from the imaging device;

a second target at a second distance from the imaging device, which is different from the first distance; and a processor, which is configured to receive an output of the sensor and to make, based on the output, first and second image quality measurements as an offset between the optics and the sensor is varied while the imaging device images the first and second targets, respectively, and to determine a working point of the optics relative to the sensor responsively to the first and second image quality measurements.

There is further provided, in accordance with an embodiment of the present invention, a system for calibration of an imaging device that includes a sensor and optics for forming an image on the sensor, the system including:

a calibration target; and a processor, which is configured to receive a specification of a working point for the imaging device, which defines an offset between the optics and the sensor, and a displacement between the working point and a reference point, and to perform a calibration procedure while the imaging device images the target so as to determine a location of the reference point responsively to an output of the sensor during the calibration procedure, wherein the imaging device is adjusted responsively to the location of the reference point and the specified displacement, so that the optics are located at the working point relative to the sensor.

The present invention will be more fully understood from the following detailed description of the embodiments thereof, taken together with the drawings in which:

DETAILED DESCRIPTION OF EMBODIMENTS

As noted earlier, in devices with extended depth of field, such as the camera described in the above-mentioned WO 2007/054938, adjusting the optics to the optimal working point may be difficult or impossible using a conventional optical calibration procedure. The optimal working point may not be the point of sharpest focus, and even if it is, the change in focal quality as a function of position of the optics may be very gradual. Consequently, it may be difficult to identify the point of sharpest focus with sufficient accuracy to provide the desired level of precision in optical adjustment.

In some embodiments of the present invention, as a part of a solution to this problem, calibration procedures first find a predefined "reference point" of the optics in the imaging device under calibration, rather than immediately finding the "working point." The reference point is defined as a known position of the optics, which can be found and measured accurately and repeatably, but is not necessarily the optimal working point. The displacement between the reference point and the working point is typically known a priori, based on theoretical considerations and/or previous high-precision laboratory testing (which cannot practically be performed as part of the calibration procedure in mass production). Thus, after the reference point for the optics in a given device has been identified in the calibration procedure, this reference point serves the starting point from which the optics are adjusted by the known displacement to reach the working point.

Using this approach, for example, the optics may be shifted first to a reference point that gives sub-optimal optical performance, but which can be located accurately in the calibration procedure. From this point, the optics may then be adjusted by a known amount (for example, by turning a thread-mounted barrel holding one or more of the lenses by a certain number of degrees) in order to reach the optimal working point. No further measurement is required, or even desirable, after this final adjustment.

Figure 1:
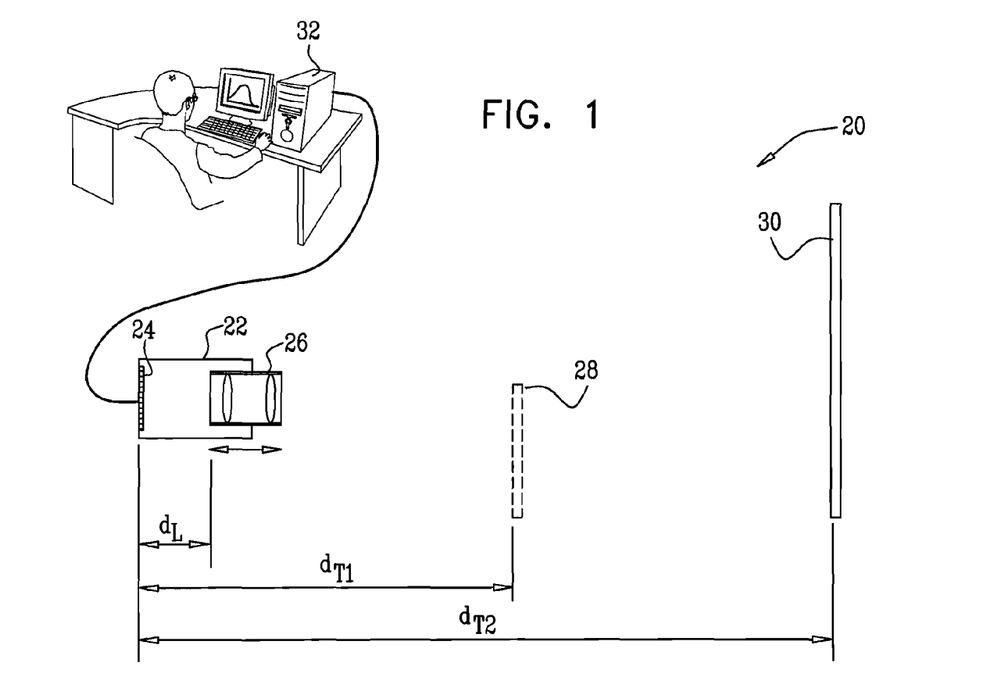
FIG. 1 is a schematic side view of a system for optical calibration, in accordance with an embodiment of the present invention.
Figure 2:
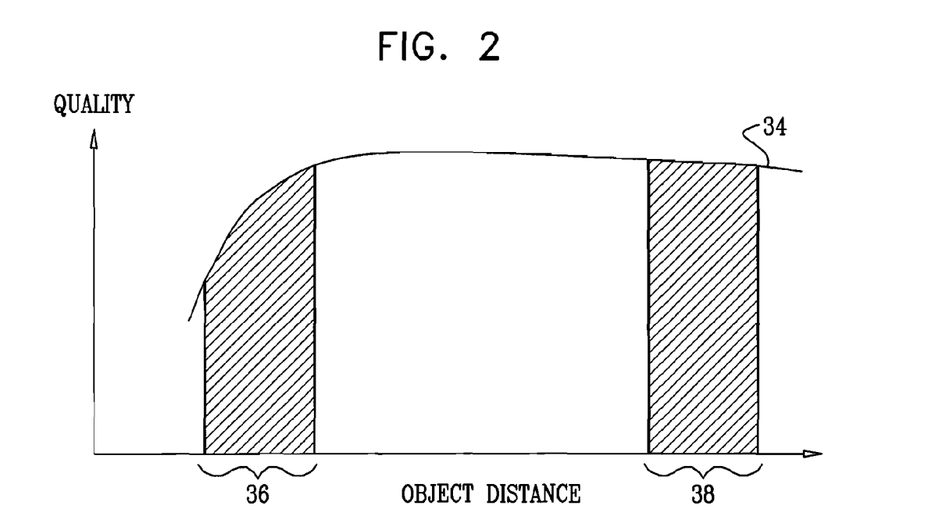
FIG. 2 is a schematic plot of optical imaging quality as a function of object distance from a camera under calibration in accordance with an embodiment of the present invention.

Reference is now made to FIGS. 1 and 2, which schematically illustrate the principles of a method for calibrating an electronic imaging camera 22, in accordance with an embodiment of the present invention. FIG. 1 is a schematic side view of a system 20 for optical calibration of the camera, while FIG. 2 is a schematic plot of optical image quality as a function of object distance from the camera when properly adjusted. Camera 22, which comprises an image sensor 24 and objective optics 26, is just one type of imaging device that may be calibrated using the principles of the present invention, and other types of imaging devices, comprising various sorts of optics and sensors, may be calibrated in a similar manner. For the sake of simplicity and clarity, however, systems and methods for calibration will be described hereinbelow with specific reference to camera 22.

It is assumed in the present embodiment that optics 26 in camera 22 are designed to provide consistent image quality over a large depth of field with "fixed focus," i.e., no adjustment of the optics, either automatic or manual, after the camera has left the factory. FIG. 2 shows a curve 34 corresponding to the expected performance of the optics. The vertical axis in the figure corresponds to a measure of image quality, such as the resolution, of the image formed by optics 26, while the horizontal axis corresponds to object distance. Curve 34 is roughly flat over a large range of distances, from an inner limit out to infinity. The camera is expected to give acceptable image quality over this entire range. The image quality may be enhanced by processing of the output of sensor 24 either by a component (not shown) within the camera, such as a deconvolution engine as described in the above-mentioned WO 2007/054938, or by other post-processing means.

The reference point in the calibration procedure may be found by measuring the performance of optics 26 at the extremes of the range shown in FIG. 2, such as in an inner sub-range 36 and an outer sub-range 38. The measurements in these two sub-ranges of the image quality, as a function of the position (displacement $d_L$) of optics 26 relative to sensor 24, are used in finding the reference point for adjustment of the optics. In order to make these quality measurements, system 20 uses two different calibration screens: a near screen 28, which is positioned at a distance $d_{T1}$ from camera 22, within sub-range 36, and a far screen 30, at a distance $d_{T2}$ in sub-range 38. Alternatively, the system may use calibration screens at three or more different distances or, in some special cases described below, at a single distance. An image processor 32 receives and analyzes image signals from camera 22 in order to compute a measure of the image quality while the camera views targets 28 and 30 and the position of optics 26 (i.e., the offset of the optics relative to sensor 24) is adjusted. This procedure is described in greater detail hereinbelow with reference to FIG. 4.

Image processor 32 typically comprises a general-purpose computer, which is programmed in software to carry out the image analysis functions that are described herein. Optionally, the image processor may be coupled to automated measuring and control equipment (not shown) for sensing the position of optics 26 during the calibration procedure, and possibly for adjusting the position of the optics, as well. Alternatively, some or all of these functions may be performed manually by a human operator. The novel principles of calibration and adjustment of the optics are applied in all such cases.

Figure 3:
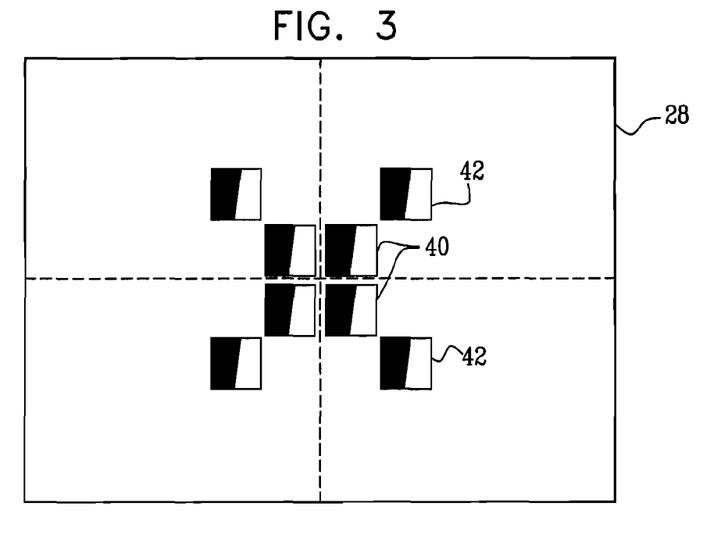
FIG. 3 is a schematic frontal view of a calibration screen, in accordance with an embodiment of the present invention.

FIG. 3 is a schematic frontal view of calibration screen 28, in accordance with an embodiment of the present invention. Screen 28 comprises targets 40 and 42, located at different field angles (for example, targets 40 at approximately 15% of full field and targets 42 at approximately 30%). Screen 30 may have a similar form, but scaled to a larger size for measurement at the larger object distance. Each target 40, 42 in this example contains a slanted edge, tilted typically between 5° and 15° from the vertical, in order to shift the location of the edge in successive rows of pixels in the image. This arrangement makes it possible to separate optical effects from pixel effects in sensor 24 by averaging over the successive rows. Processor 32 analyzes the output of camera 22 in the vicinity of these edges in order measure the image quality in terms of the sharpness of the edges. Alternatively, any other suitable type of calibration target and concomitant quality measure may be used in system 20.

Figure 4:
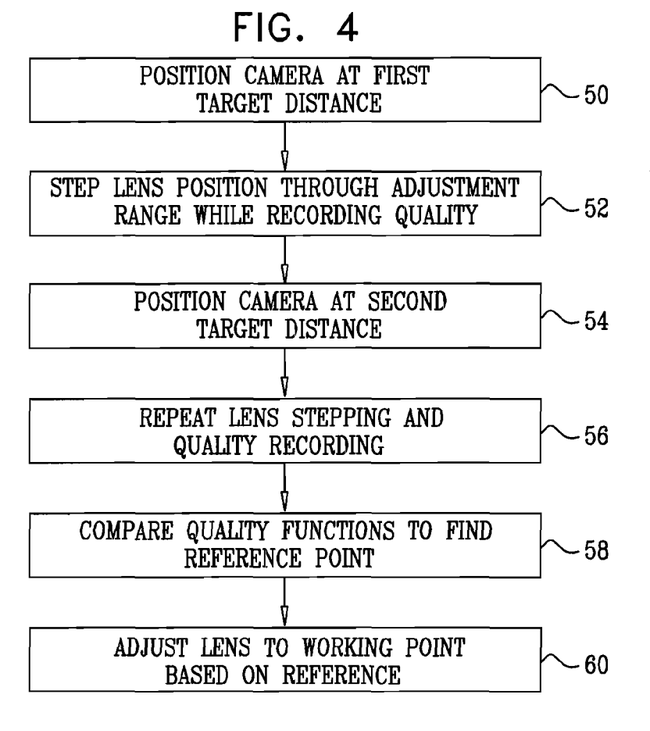
FIG. 4 is a flow chart that schematically illustrates a method for optical calibration, in accordance with an embodiment of the present invention.

FIG. 4 is a flow chart that schematically illustrates a method for optical calibration of camera 22 in calibration system 20, in accordance with an embodiment of the present invention. The camera is mounted in the calibration system and is set up to image screen 28 at distance $d_{T1}$, in a first target setup step 50. Lens 26 and sensor 24 are initially positioned in the camera with a certain offset between them, typically at one end of the overall adjustment range of the offset between the lens and the sensor. In the description that follows, it will be assumed, for simplicity and clarity, that the position of the sensor is fixed while the position of the lens is adjusted, but the offset may likewise be controlled by moving the sensor or moving both the lens and the sensor (in such a way as to change the distance between the lens and the sensor). In the present embodiment, the position of the lens relative to the sensor is stepped (or otherwise adjusted) from the initial position through the range of possible offsets, at a first adjustment step 52. At each point of the adjustment, processor 32 measures and records the image quality of calibration targets 40 and/or 42 based on the output of the camera. Typically, during this step, the distance between camera 22 and screen 28 is held constant.

Substantially any suitable quality measure may be used at step 52, depending, inter alia, on the type of target, although it is preferable that the selected measure have low sensitivity to random noise. The inventors have found it useful, for example, to measure the step response, i.e., the spread of the edges in targets 40 and 42 as they appear in the output from sensor 24. The spread may be defined as the distance between the 10% and 90% intensity points on opposite sides of the edge, wherein the actual image quality is inversely proportional to the edge spread.

Camera 22 is next set up to image screen 30 at distance $d_{T2}$, at a second target setup step 54. (Either the camera or the targets may be repositioned.) Lens 26 is again stepped through its adjustment range, while keeping the distance between the camera and the screen constant, and processor 32 measures and records the image quality, at a second adjustment step 56. At the conclusion of this step, processor has two traces of image quality as a function of lens offset, for near and far target distances. The processor compares these traces to determine the location of a reference point in the offset of the optics relative to the sensor, at a reference determination step 58. Depending on the specifications of camera 22 and the calibration procedure, this reference point may itself be the working point of the camera. If not, lens 26 is adjusted by the specified displacement to the working point, and is then fixed in place, at a working point adjustment step 60.

Figure 5:
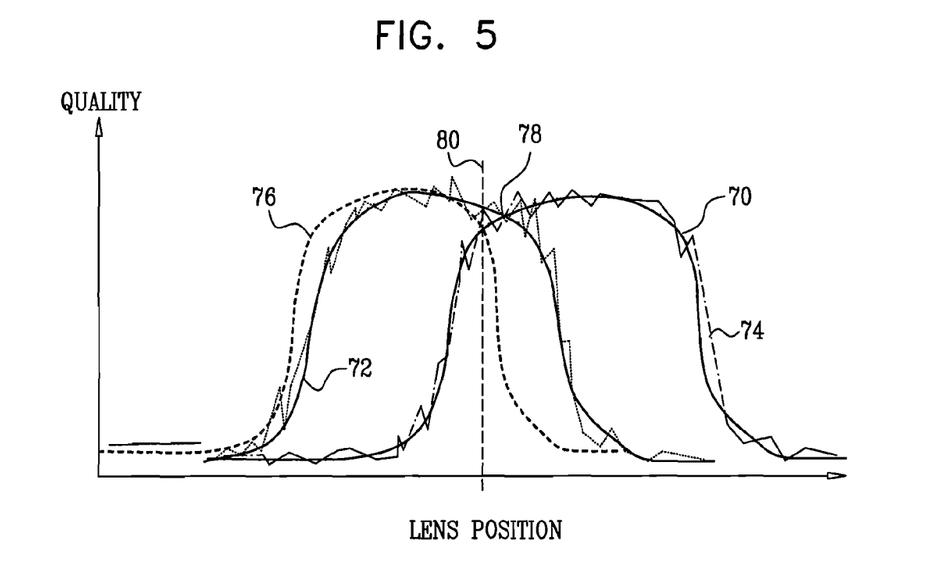
FIG. 5 is a schematic plot of optical image quality as a function of lens position in a camera under calibration in accordance with an embodiment of the present invention.

FIG. 5 is a schematic plot of optical image quality as a function of lens position in camera 22, illustrating the results of the method of FIG. 4, in accordance with an embodiment of the present invention. A curve 70 represents the image quality measured at step 52, using screen 28, while a curve 72 represents the image quality measured at step 56, using screen 30. (Typically, curves 70 and 72 are smoothed, and the actual measurements, including noise, are illustrated by measured curves 74.) A reference point 78 is determined at step 58 to be the lens position at which curves 70 and 72 cross. This sort of point can be identified repeatably and unambiguously, and generally represents a good compromise between near- and far-field performance of the camera.

A further curve 76 represents the theoretical performance of optics 26 for a target at infinity. This curve is shifted by a certain expected displacement relative to curve 72, which represents the performance of the optics at distance $d_{T2}$. A working point 80 of camera 22 corresponds to the lens position at which curves 70 and 76 cross, but this working point cannot readily be found by direct measurement in a practical production-line calibration setup, such as in system 20. Therefore lens 26 is shifted closer to sensor 24 at step 60 by an amount equal to the expected displacement between points 78 and 80.

Figure 6:
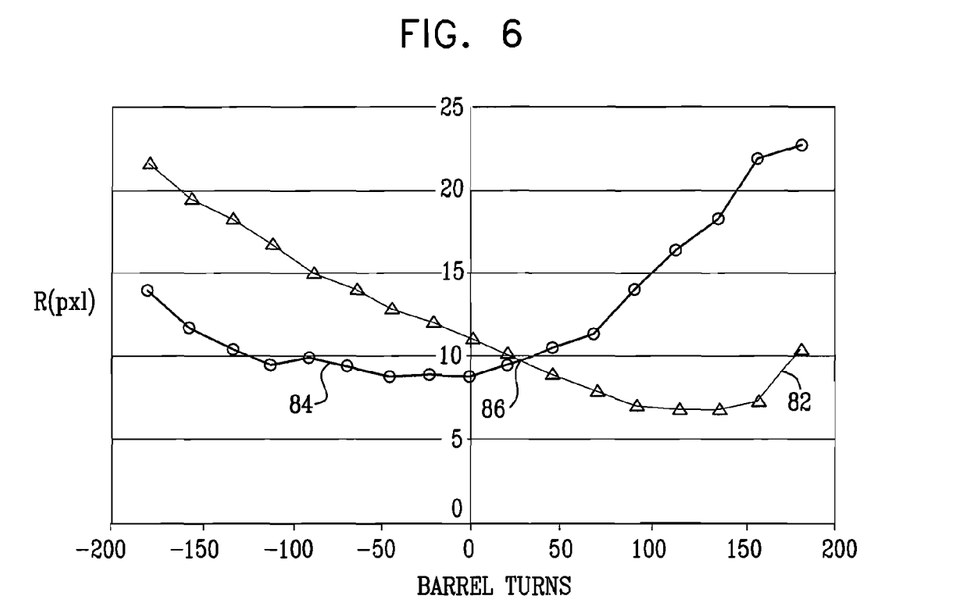
FIG. 6 is a schematic plot of optical image quality as a function of lens position in a camera under calibration in accordance with another embodiment of the present invention.

FIG. 6 is a schematic plot of optical imaging quality as a function of lens position in camera 22, in accordance with another embodiment of the present invention. In this example, a curve 82 represents the image quality measurement made at $d_{T1}=17$ cm, while a curve 84 represents the measurement at $d_{T2}=200$ cm. The position of the camera lens was adjusted by turning a cylindrical barrel containing the lens in a threaded mount, and the horizontal axis in the figure corresponds to degrees of rotation. The quality measure used in this case (R) was the distance (in pixels) measured between the 10% and 90% intensity points on opposite sides of an edge, as explained above. Consequently, the lower the value of R that was measured for a given lens position, the higher the image quality at that position. A reference point 86 is indicated by the crossing point of curves 82 and 84. As noted above, the working point may be displaced relative to this reference point by a known rotation of the lens barrel.

In the measurement curves shown in FIGS. 5 and 6, the extrema of the curves (i.e., the tops of curves 70 and 72 or the bottoms of curves 82 and 84) are relatively flat. This sort of behavior is common in optical designs for extended depth of field, but it can reduce the accuracy of calibration. To moderate the impact of this problem, system 20 may use narrowband, monochromatic lighting of screens 28 and 30. The inventors have found that this approach yields narrower, sharper extrema and can thus enhance the accuracy of calibration in some situations.

Figure 7A:
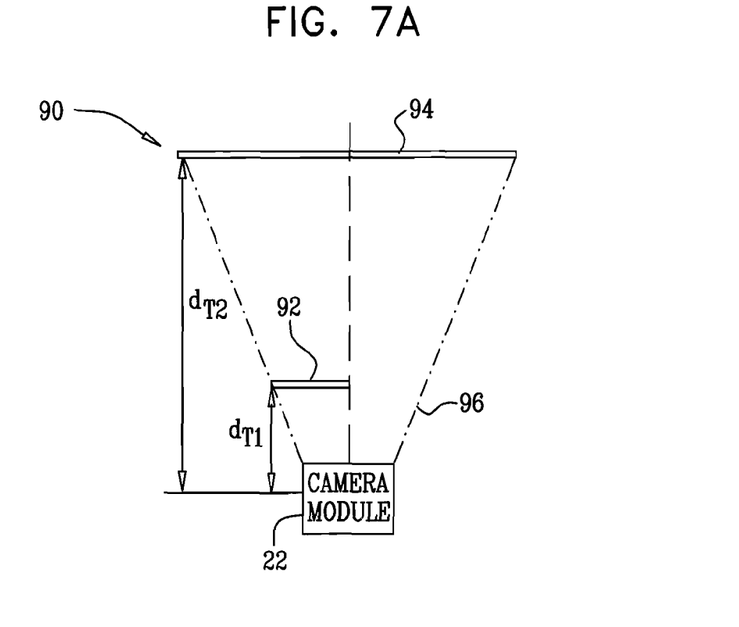
FIGS. 7A and 7B are schematic top and frontal views of a system for optical calibration, in accordance with an alternative embodiment of the present invention.
Figure 7B:
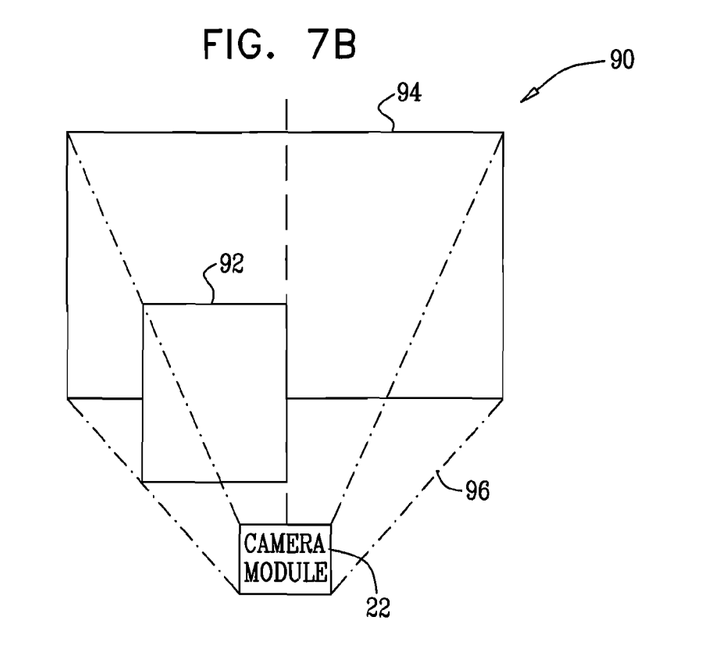

FIGS. 7A and 7B are schematic top and frontal views, respectively, of a system 90 for optical calibration of camera 22, in accordance with an alternative embodiment of the present invention. In this embodiment, a near screen 92 with one or more calibration targets occupies only a part of the central field of view 96 of the camera, so that the camera simultaneously views both the near screen and a far screen 94. The targets appearing on screens 92 and 94 should, of course, be scaled for the respective distances $d_{T1}$ and $d_{T2}$. This arrangement permits steps 52 and 56 (FIG. 4) to be carried out simultaneously, without moving the camera or targets.

Although screen 92 is shown in FIGS. 7A and 7B as occupying the entire left half of field of view 96, other arrangements of near and far targets for simultaneous viewing may likewise be used in system 90. For example, screen 92 may be replaced by two smaller calibration screens in the upper left and lower right quadrants. This latter arrangement permits the symmetry of the performance of camera 22 to be checked at the same time as the lens offset is calibrated.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for calibrating an imaging device that includes a sensor and optics for forming an image on the sensor, the method comprising:
   making a first set of image quality measurements on images of a first target that are captured by the sensor while imaging the first target at a first distance from the device at various offsets between the optics and the sensor;
   making a second set of image quality measurements on images of a second target that are captured by the sensor while imaging the second target at a second distance from the device, which is different from the first distance, at various offsets between the optics and the sensor; and
   setting a working point of the optics relative to the sensor based at least in part upon the first and second sets of image quality measurements.

2. The method according to claim 1, wherein making the first and second sets of image quality measurements comprises completing the first set of image quality measurements, and then performing the second set of image quality measurements.

3. The method according to claim 1, wherein making the first and second sets of image quality measurements comprises performing the first and second sets of image quality measurements simultaneously, with the first and second targets positioned in different, respective parts of a field of view of the imaging device.

4. The method according to claim 1, wherein the first and second targets comprises edges, and wherein making the first and second sets of image quality measurements comprises measuring a spread of the edges in the images captured by the sensor.

5. The method according to claim 1, wherein making the first and second sets of image quality measurements comprises generating first and second curves representing a measure of image quality as a function of the offset, and wherein setting the working point comprises identifying a reference point at which the first and second curves cross one another.

6. The method according to claim 5, wherein setting the working point comprises adjusting the offset between the optics and the sensor by a specified displacement from the reference point in order to reach the working point.

7. The method according to claim 1, wherein making the first and second sets of image quality measurements comprises illuminating the first and second targets with monochromatic illumination while making the image quality measurements.

8. A method for calibrating an imaging device that includes a sensor and optics for forming an image on the sensor, the method comprising:
   determining a displacement between a working point for the imaging device and a reference point, wherein the working point defines an offset between the optics and the sensor;
   performing a calibration procedure so as to determine a location of the reference point responsively to an output of the sensor during the calibration procedure; and
   adjusting the imaging device responsively to the location of the reference point and the displacement, so that the optics are located at the working point relative to the sensor.

9. The method according to claim 8, wherein performing the calibration procedure comprises imaging a calibration target onto the sensor using the optics, wherein the offset between the optics and the sensor that is defined by the working point is not the offset that gives the sharpest image of the calibration target on the sensor.

10. A system for calibrating an imaging device that includes a sensor and optics for forming an image on the sensor, the system comprising:
    a first target at a first distance from the imaging device;
    a second target at a second distance from the imaging device, which is different from the first distance; and
    a processor, which is configured to make a first set of image quality measurements on images of the first target that are captured by the sensor while imaging the first target at the first distance at various offsets between the optics and the sensor, make a second set of image quality measurements on images of the second target that are captured by the sensor while imaging the second target at the second distance at various offsets between the optics and the sensor, and determine a working point of the optics relative to the sensor based at least in part upon the first and second sets of image quality measurements.

11. The system according to claim 10, wherein the processor is configured to complete the first set of image quality measurements, and then to perform the second set of image quality measurements.

12. The system according to claim 10, wherein the first and second targets are positioned in different, respective parts of a field of view of the imaging device, and the processor is configured to make the first and second sets of image quality measurements simultaneously.

13. The system according to claim 10, wherein the first and second targets comprise edges, and wherein making the first and second sets of image quality measurements comprises measuring a spread of the edges in the images captured by the sensor.

14. The system according to claim 10, wherein the processor is configured, as part of making the first and second sets of image quality measurements, to generate first and second curves representing a measure of image quality as a function of the offset, and wherein the processor is configured, as part of determining the working point, to identify a reference point at which the first and second curves cross one another.

15. The system according to claim 14, wherein the processor is configured, as part of determining the working point, to adjust the reference point by a displacement to derive the working point.

16. A system for calibrating an imaging device that includes a sensor and optics for forming an image on the sensor, the system comprising:
  a calibration target; and
  a processor, which is configured to receive a displacement between a working point for the imaging device and a reference point, wherein the working point defines an offset between the optics and the sensor, and to perform a calibration procedure while the imaging device images the target so as to determine a location of the reference point responsively to an output of the sensor during the calibration procedure,
  wherein the imaging device is adjusted responsively to the location of the reference point and the specified displacement, so that the optics are located at the working point relative to the sensor.

17. The system according to claim 16, wherein the offset between the optics and the sensor that is defined by the working point is not the offset that gives the sharpest image of the calibration target on the sensor.

18. The method according to claim 1, wherein setting the working point of the optics comprises:
  determining, based at least in part upon the first and second sets of image quality measurements, a reference point of the optics relative to the sensor; and
  deriving the working point based at least in part upon the reference point.

19. The method according to claim 18, wherein the working point is derived based at least in part upon the reference point and a displacement between the reference point and the working point.

20. A computer for use in calibrating an imaging device that includes a sensor and optics for forming an image on the sensor, the computer comprising one or more processors programmed by software to perform the following operations:
  making a first set of image quality measurements on images of a first target that are captured by the sensor while imaging the first target at a first distance from the device at various offsets between the optics and the sensor;
  making a second set of image quality measurements on images of a second target that are captured by the sensor while imaging the second target at a second distance from the device, which is different from the first distance, at various offsets between the optics and the sensor; and
  determining a working point of the optics relative to the sensor based at least in part upon the first and second sets of image quality measurements.

21. The computer according to claim 20, wherein making the first and second sets of image quality measurements comprises completing the first set of image quality measurements, and then performing the second set of image quality measurements.

22. The computer according to claim 20, wherein making the first and second sets of image quality measurements comprises performing the first and second sets of image quality measurements simultaneously, with the first and second targets positioned in different, respective parts of a field of view of the imaging device.

23. The computer according to claim 20, wherein the first and second targets comprise edges, and wherein making the first and second sets of image quality measurements comprises measuring a spread of the edges in the images captured by the sensor.

24. The computer according to claim 20, wherein making the first and second sets of image quality measurements comprises generating first and second curves representing a measure of image quality as a function of the offset, and wherein determining the working point comprises identifying a reference point at which the first and second curves cross one another.

25. The computer according to claim 24, wherein determining the working point comprises adjusting the reference point by a displacement to derive the working point.

26. The computer according to claim 20, wherein determining the working point comprises:
  determining, based at least in part upon the first and second sets of image quality measurements, a reference point of the optics relative to the sensor; and
  deriving the working point based at least in part upon the reference point.

27. The computer according to claim 26, wherein the working point is derived based at least in part upon the reference point and a displacement between the reference point and the working point.

* * * * *

UNITED STATES PATENT AND TRADEMARK OFFICE
CERTIFICATE OF CORRECTION

| | | |
|---|---|---|
| PATENT NO. | : 7,999,851 B2 | Page 1 of 1 |
| APPLICATION NO. | : 12/125132 | |
| DATED | : August 16, 2011 | |
| INVENTOR(S) | : Liron Nunez Weissman et al. | |

It is certified that error appears in the above-identified patent and that said Letters Patent is hereby corrected as shown below:

In the claims:

Column 7, claim 4, line 64, replace "comprises" with --comprise--.

Signed and Sealed this
Eleventh Day of October, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,999,851 B2 | Page 1 of 1 |
| APPLICATION NO. | : 12/125132 | |
| DATED | : August 16, 2011 | |
| INVENTOR(S) | : Liron Nunez Weissman et al. | |

It is certified that error appears in the above-identified patent and that said Letters Patent is hereby corrected as shown below:

On the Title page, item [73] Assignee: replace "Tessera Technologies Ltd." with
-- Tessera International, Inc. --

Signed and Sealed this
Fourteenth Day of February, 2012

David J. Kappos
*Director of the United States Patent and Trademark Office*